(12) United States Patent
Perrie et al.

(10) Patent No.: US 7,999,926 B2
(45) Date of Patent: Aug. 16, 2011

(54) METHOD AND DEVICE FOR DETERMINING ANEMOMETRIC PARAMETERS OF AN AIRCRAFT

(75) Inventors: Jean-Damien Perrie, Toulouse (FR); Guillaume Preaux, Toulouse (FR)

(73) Assignee: Airbus Operations (SAS) (FR)

( * ) Notice: Subject to any disclaimer, the term of this patent is extended or adjusted under 35 U.S.C. 154(b) by 38 days.

(21) Appl. No.: 12/622,877

(22) Filed: Nov. 20, 2009

(65) Prior Publication Data
US 2010/0128251 A1    May 27, 2010

(30) Foreign Application Priority Data
Nov. 24, 2008 (FR) ..................... 08 06587

(51) Int. Cl.
*G01P 3/36* (2006.01)
*G01N 21/00* (2006.01)

(52) U.S. Cl. ........................ 356/28; 356/337

(58) Field of Classification Search ............. 356/28, 356/28.5, 337
See application file for complete search history.

(56) References Cited

U.S. PATENT DOCUMENTS

| | | | | |
|---|---|---|---|---|
| 3,528,741 | A * | 9/1970 | Kaufman et al. | 356/28 |
| 4,483,614 | A * | 11/1984 | Rogers | 356/28.5 |
| 5,394,238 | A * | 2/1995 | Mocker et al. | 356/342 |
| 5,616,861 | A * | 4/1997 | Hagen | 73/180 |
| 7,770,445 | B2 * | 8/2010 | Lassouaoui et al. | 73/170.11 |
| 7,894,045 | B2 * | 2/2011 | Caldwell et al. | 356/28.5 |
| 2004/0027570 | A1 | 2/2004 | Caldwell et al. | |

FOREIGN PATENT DOCUMENTS
WO   WO 2007/036662   4/2007

OTHER PUBLICATIONS

Pogosov, et al., "Use of On-Board Laser Doppler Systems to Measure the Wind-Speed Parameters of Aircraft Flight," Consultants Bureau, NY, vol. 37, No. 9, Sep. 1, 1994.
Rouse, et al., "Development of a Laser Wind and Hazard Profiler," International Society for Optical Engineering, SPIE, vol. 2840, No. 8, Aug. 8, 1996, pp. 157-167.

* cited by examiner

Primary Examiner — Isam Alsomiri
(74) Attorney, Agent, or Firm — Gregory A. Nelson; Michael P. Byrne; Novak Druce + Quigg LLP

(57) ABSTRACT

A method and device for determining anemometric parameters of an aircraft. The device (1) comprises four laser anemometers (A1, A2, A3, A4) that are mounted in pairs (CA, CB) symmetrically on the aircraft and means (4, 5) for determining the angle of sideslip and the angle of incidence of the aircraft, using measurements taken by these laser anemometers (A1, A2, A3, A4).

6 Claims, 2 Drawing Sheets

METHOD AND DEVICE FOR DETERMINING ANEMOMETRIC PARAMETERS OF AN AIRCRAFT

CROSS-REFERENCE TO RELATED APPLICATIONS

This application claims priority to French Patent Application 0806587, filed Nov. 24, 2008, the entire contents of which are incorporated herein by reference.

FIELD OF THE INVENTION

The present invention relates to a method and a device for determining anemometric parameters of an aircraft, in particular of a transport airplane.

BACKGROUND OF THE INVENTION

It is known that on board an aircraft, it is important to know certain information relating to the flight of the aircraft. Anemometric measuring techniques can be used to ascertain such information. It may notably concern parameters relating to the air around the aircraft, such as static pressure, dynamic pressure or total temperature. It may also concern parameters relating to the position of the aircraft in its environment, such as the speed of the aircraft, its angle of incidence or its angle of sideslip. The angle of incidence is the angle between the air flow direction and the horizontal trajectory of the aircraft, and the angle of sideslip is the angle between the air flow direction and the trajectory of the aircraft.

From the value of some of these parameters, it is possible to determine the value of certain others of these parameters. Also, to ascertain the value of all the anemometric parameters useful on board the aircraft, some of these anemometric parameters are measured, and the other parameters are deduced from these measurements.

Currently, the parameters on board the aircraft are measured, generally, by means of different probes that are placed outside the aircraft, on the outer skin of the latter.

It is also known to measure some of these anemometric parameters using a laser anemometer, as described for example in the document WO-2007/036662 which relates to a system for monitoring anemobaroclinometric parameters of an aircraft.

Although not exclusively, the present invention more particularly applies to the simultaneous determination of the angle of incidence and of the angle of sideslip of an aircraft.

It is known that a standard probe intended for measuring both the angle of incidence and the angle of sideslip, that is installed on one side of the aircraft, cannot provide sufficient measurements for directly calculating the values of said angles of incidence and of sideslip. In practice, the measurement, at any point of the aircraft (except in a horizontal plane that is parallel to the general plane of the supporting surface, and in a vertical longitudinal plane that is orthogonal to this horizontal plane), taken by an anemometric probe depends, in particular, simultaneously, on the angle of incidence and on the angle of sideslip. The duly taken measurement therefore corresponds to a combination of these two angles (of incidence and of sideslip) making an exact and independent determination of each of these angles impossible.

SUMMARY OF THE INVENTION

The object of the present invention is to remedy these drawbacks. It relates to a method that makes it possible to automatically determine anemometric parameters on an aircraft, and at least, directly and simultaneously, the angle of incidence and the angle of sideslip of the aircraft.

To this end, according to the invention, said method of the type using at least one laser anemometer that is capable of measuring the wind speed along a laser axis, is noteworthy in that four laser anemometers are mounted in pairs on the aircraft, said pairs being mounted symmetrically relative to a vertical plane that corresponds to a plane passing through the longitudinal axis of the aircraft and orthogonal to the general plane of the supporting surface of said aircraft, and in that:

using each of said laser anemometers, a wind measurement is taken, each of said measurements representing the projection of the wind speed vector on the corresponding laser axis;

for each pair of laser anemometers, the two measurements (taken by the two anemometers of the pair) are projected onto an associated reference plane and a speed vector resulting from these two projections into this reference plane is calculated, said reference plane which is associated with a pair of laser anemometers being a plane that is parallel to the plane tangential to the structure of the aircraft at a reference point that depends on the arrangement of the two laser anemometers of said pair on the aircraft; and using the two duly calculated speed vectors (one speed vector for each pair of anemometers), and at least one reference table, the respective values of the angle of incidence and the angle of sideslip of the aircraft are determined.

Thus, thanks notably to measurements taken from pairs of laser anemometers, that are installed symmetrically relative to said vertical plane, two speed vectors are obtained, in particular reference planes, that both depend on the angle of incidence and on the angle of sideslip. From these two speed vectors, and at least one reference table specified hereinbelow, it becomes possible to directly determine a single pair of angles of sideslip and of incidence.

Consequently, thanks to the invention, both the angle of sideslip and the angle of incidence of the aircraft can be determined simply, quickly and accurately.

Furthermore, advantageously:

for a pair of laser anemometers, for which the corresponding laser axes emerge from one and the same point of the structure, said reference point corresponds to this point of the structure; or for a pair of laser anemometers, for which the two corresponding laser axes emerge from two different points of the structure, said reference point corresponds to the middle of these two points.

Moreover, advantageously, the external temperature is determined, and the true speed of TAS ("True Air Speed") type is calculated, using the duly determined external temperature and said two speed vectors.

The present invention also relates to a device for determining anemometric parameters of an aircraft, said device comprising at least one standard laser anemometer that is capable of measuring the wind speed along a laser axis.

According to the invention, said device is noteworthy in that it comprises:

four laser anemometers that are arranged in pairs on the aircraft, said pairs being mounted symmetrically relative to a vertical plane that corresponds to a plane passing through the longitudinal axis of the aircraft and orthogonal to the general plane of the supporting surface of said aircraft, each of said laser anemometers taking a measurement of the wind, which represents the projection of the wind speed vector on the corresponding laser axis; and first processing means for projecting, for each pair of laser anemometers, the two measurements onto an associated reference plane and for calculating a speed vector resulting from these two projections into this reference plane, said reference plane which is associated with a pair of laser anemometers being a plane that is parallel to the plane tangential to the structure of the aircraft at a reference point that depends on the arrangement of the two laser anemometers of said pair on the aircraft; and second processing means for using the two duly calculated speed vectors, and at least one reference table, to determine the respective values of the angle of incidence and of the angle of sideslip of the aircraft.

The present invention also relates to an aircraft, in particular a transport airplane (notably civilian), that comprises a device such as that mentioned above.

BRIEF DESCRIPTION OF THE DRAWINGS

The figures of the appended drawing will clearly show how the invention can be implemented. In these figures, identical references designate similar elements.

DETAILED DESCRIPTION

Figure 1:
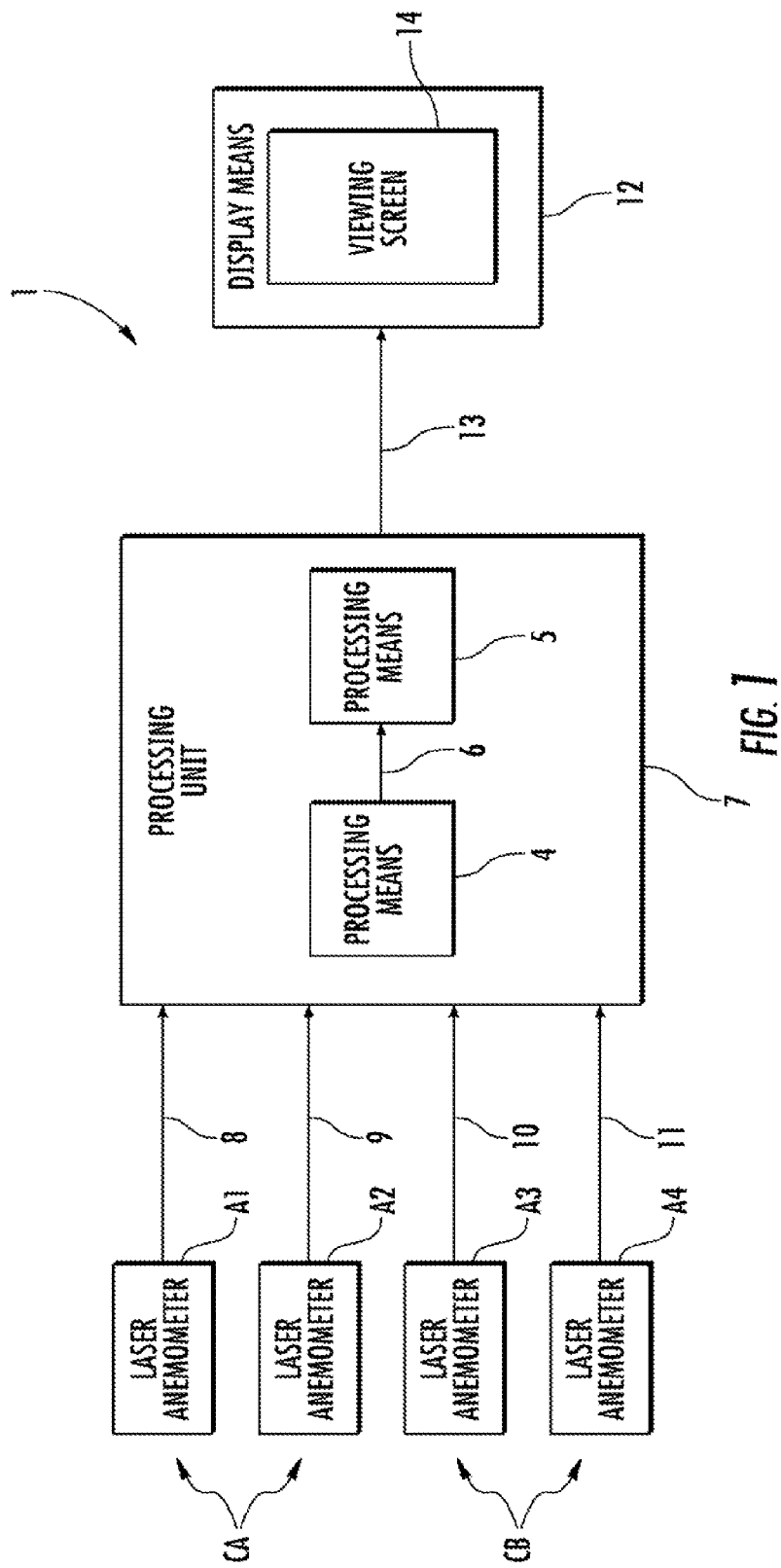
FIG. 1 is the block diagram of a device according to the invention.

The device 1 according to the invention and diagrammatically represented in FIG. 1 is intended for determining anemobarometric parameters of an aircraft A, in particular of a transport airplane.

Figure 2:
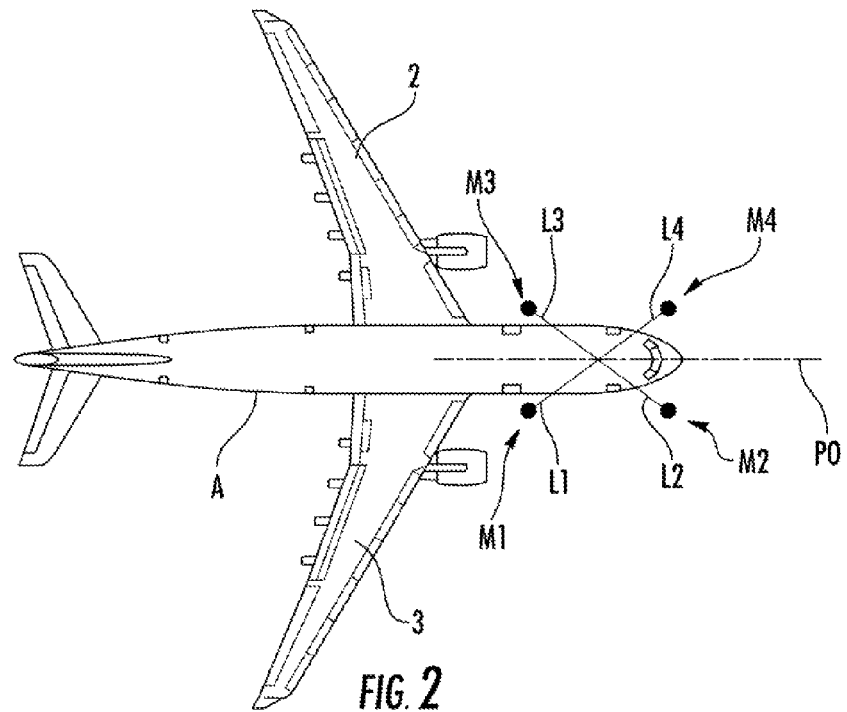
FIG. 2 diagrammatically shows an aircraft, on which the orientation of the laser axes of laser anemometers forming part of a device according to the invention are shown.

To do this, according to the invention, said device 1 that is on board comprises, as represented in FIG. 1:

four laser anemometers A1, A2, A3 and A4 of respective laser axes L1, L2, L3 and L4, that are arranged in pairs CA and CB on the aircraft A. These two pairs CA and CB are mounted symmetrically to each other, relative to a vertical plane P0 that corresponds to a plane passing through the longitudinal axis of the aircraft A and orthogonal to the general plane of the supporting surface (that is, the wings 2 and 3) of said aircraft A, as represented in FIG. 2. Each of said laser anemometers A1, A2, A3, A4 takes, in the standard manner, a wind measurement. This measurement represents the projection (illustrated by a vector V1, V2, V3, V4 on FIG. 3) of the wind speed vector on the corresponding laser axis L1, L2, L3, L4;

processing means 4 for carrying out the following processing operations for each of said pairs CA and CB: projecting the two measurements onto an associated reference plane (V1 and V2 on a plane PA for the pair CA; V3 and V4 on a plane PB for the pair CB) and calculating a speed vector VA, VB resulting from these two projections into this reference plane PA, PB. The speed vector VA is obtained by the vector sum of the projectors on the plane PA of the measured vectors V1 and V2 and the speed vector VB is obtained by the vector sum of the projections onto the plane PB of the measured vectors V3 and V4; and processing means 5 that are linked via a link 6 to said processing means 4 and that are formed in such a way as to determine, using the two duly calculated speed vectors VA and VB, and at least one reference table specified hereinbelow, the respective values of the angle of incidence and of the angle of sideslip of the aircraft A.

The two speed vectors VA and VB as defined previously each depend, in practice, on both the angle of incidence and the angle of sideslip of the aircraft A.

It is known that:

the angle of incidence is the angle between the cord of the wings 2 and 3 of the aircraft A and the direction of the air flow in which the aircraft A is advancing; and the angle of sideslip is the angle of the air relative to the trajectory of the aircraft A.

Said reference plane PA, PB (represented in FIG. 3) that is associated with a pair CA, CB of laser anemometers is a plane that is parallel to a plane PA0, PB0 and that is situated at the level of the measurement volume or volumes of the laser anemometers. The plane PA0, PB0 is tangential to the structure of the aircraft A at a reference point RA, RB, specified hereinbelow, that depends on the arrangement of the two laser anemometers of said pair CA, CB on the aircraft A.

In a particular embodiment, said processing means 4 and 5 form part of a processing unit 7 that is linked via links 8, 9, 10 and 11 respectively to said laser anemometers A1, A2, A3 and A4. Said device 1 further comprises display means 12 that are linked via a link 13 to said processing unit 7 and that are capable of presenting the parameters automatically determined by said processing unit 7 to a pilot of the aircraft, in particular by displaying them on a viewing screen 14.

Thus, thanks to the measurements taken from pairs CA and CB of laser anemometers, pairs that are installed symmetrically relative to a vertical plane P0, two speed vectors VA and VB are obtained, in particular reference planes PA and PB, that both depend on the angle of incidence and on the angle of sideslip of the aircraft A. From these two speed vectors VA and VB, and from at least one reference table specified hereinbelow, the processing means 5 can directly determine a single pair of angles of sideslip and incidence.

Consequently, the device 1 according to the invention is capable of determining, simply, quickly and accurately, both the angle of sideslip and the angle of incidence of the aircraft A.

In a first embodiment, for a pair of laser anemometers of the device 1, the corresponding laser axes L3 and L4 emerge from one and the same point RB of the structure of the aircraft A. In this case, said reference point RB corresponds to this point of the structure, as represented in the right hand part D of FIG. 3.

Figure 3:
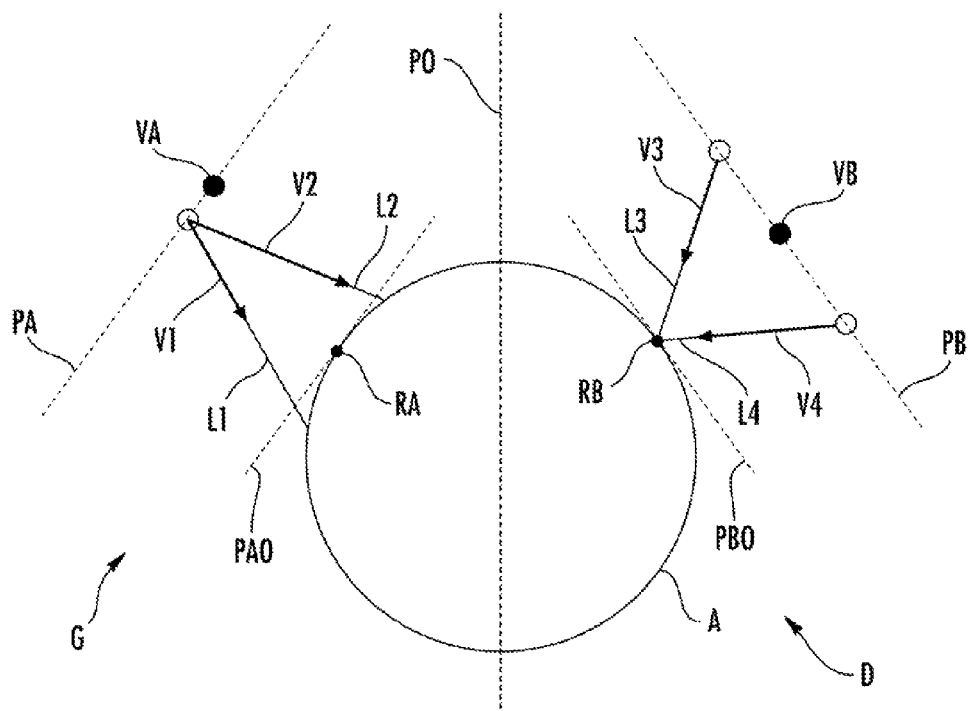
FIG. 3 is a graph that can be used to explain the calculations implemented by the device according to the invention.

Furthermore, in a second embodiment, for a pair of laser anemometers of the device 1, the two corresponding laser axes L1 and L2 emerge from two different points of the structure of the aircraft A (and take the measurements, either at the level of one and the same measurement volume, as represented in FIG. 3, or at the level of two different measurement volumes). In this case, said reference point RA corresponds to the middle of these two points of the structure, as represented in the left hand part G of FIG. 3.

In the context of the present invention, the two pairs CA and CB of laser anemometers are mounted symmetrically, either in the manner represented in the right hand part D of FIG. 3, or in the manner represented in the left hand part G of FIG. 3.

Moreover, as indicated previously, to determine the current values respectively of the angle of incidence and of the angle of sideslip, the processing means 5 use at least one reference table. This reference table (or aerodynamic correction table)

provides, for a single pair of speed vectors VA and VB (determined in the manner defined previously), a single pair of angles of incidence and of sideslip.

As an illustration, one method of determining a pair $(\alpha,\beta)$ of angle of incidence $\alpha$ and of angle of sideslip $\beta$ may be as follows, using the measurement on each side of the aircraft A of an angle $\theta g(\alpha,\beta)$ and $\theta d(\alpha,\beta)$:

A/ first of all, it is assumed that $\beta=0$ and the following is obtained: $\theta g(\alpha,\beta=0)=\theta'd(\alpha,\beta=0)=\theta'(\alpha)=\gamma\cdot\alpha$ B/ the value of $\beta i$ is determined with a first order development:

$$\theta g(\alpha,\beta) = \gamma\cdot\alpha i + \frac{\partial\theta(\alpha)}{\partial\beta}\cdot|\beta i|$$

$$\theta d(\alpha,\beta) = \gamma\cdot\alpha i + \frac{\partial\theta(\alpha)}{\partial\beta}\cdot|\beta i|$$

$$\theta g(\alpha,\beta) = \gamma\cdot\alpha i + \frac{\partial\theta(\alpha)}{\partial\beta}\cdot\frac{\partial\alpha}{\partial\beta}\cdot|\beta i|$$

$$\theta d(\alpha,\beta) = \gamma\cdot\alpha i + \frac{\partial\theta(\alpha)}{\partial\beta}\cdot\frac{\partial\alpha}{\partial\beta}\cdot|\beta i|$$

$$\theta g(\alpha,\beta) = \gamma\cdot\alpha i + \xi\cdot\frac{\partial\alpha}{\partial\beta}\cdot|\beta i|$$

$$\theta d(\alpha,\beta) = \gamma\cdot\alpha i + \xi\cdot\frac{\partial\alpha}{\partial\beta}\cdot|\beta i|$$

C/ the determination of $$\frac{\partial\alpha}{\partial\beta}$$

is known and corresponds to a constant K that depends on the type of aircraft A and on the positioning of the probes whatever they may be (in this case, laser anemometers A1 to A4). This constant K is given by a mapping table between $\alpha$ and $\beta$ by the same method (first order development of $\alpha(\beta)$ and study of the variations of $\beta$ as a function of $\alpha$ about the angles $\alpha$ concerned, with, generally $\alpha=8°$] as previously, but with simulations and an aerodynamic mesh around the aircraft A; and D/ the resolution of the system of equations, thanks to the measurements on the right and on the left, makes it possible to establish a bijection between the measurements on each side of the aircraft A and the pair $(\alpha,\beta)$.

A laser anemometer A1, A2, A3, A4, as considered in the present invention, for taking measurements, uses the frequency offset that a monochromatic light wave undergoes, in particular a laser wave, when backscattered by aerosols (particles and/or molecules) present in the air. This offset can be used to determine the component of the wind speed vector along the line of sight (or laser axis). More specifically, the laser anemometer A1, A2, A3, A4 emits a laser radiation (along its laser axis L1, L2, L3, L4) to a predetermined distance of a few meters or a few tens of meters beyond the aircraft A into a measurement volume M1, M2, M3, M4, and it receives this laser radiation after it is backscattered by the air. The component V1, V2, V3, V4 (to be determined) of the speed vector along the laser axis L1, L2, L3, L4 is then directly linked to the change of wavelength of the laser radiation.

FIG. 2 shows the four laser axes L1 to L4 of the four laser anemometers A1 to A4 of the device 1, and the associated measurement volumes M1 to M4, that are diagrammatically shown by black dots.

In a particular embodiment, said device 1 also comprises standard means (not represented) for determining (or measuring) the external temperature, and the processing unit 7 also comprises integrated means (not represented) for calculating the true speed of TAS type of the aircraft A, that is to say, the speed of the center of gravity of the aircraft A relative to the undisturbed air, using the duly determined external temperature and the abovementioned two speed vectors VA and VB.

The invention claimed is:

1. A method of determining anemometric parameters of an aircraft (A), said method using at least one laser anemometer (A1 to A4) that is capable of measuring the wind speed along a laser axis (L1 to L4), in which four laser anemometers (A1 to A4) are mounted in pairs (CA, CB) on the aircraft (A), said pairs (CA, CB) being mounted symmetrically relative to a vertical plane (P0) that corresponds to a plane passing through the longitudinal axis of the aircraft (A) and orthogonal to the general plane of the supporting surface (2, 3) of said aircraft (A), and in which:

using each of said laser anemometers (A1 to A4), a wind measurement is taken, each of said measurements representing the projection (V1 to V4) of the wind speed vector on the corresponding laser axis (L1 to L4);

for each pair (CA, CB) of laser anemometers, the two measurements (V1, V2; V3, V4) are projected onto an associated reference plane (PA, PB) and a speed vector (VA, VB) resulting from these two projections into this reference plane (PA, PB) is calculated, said reference plane (PA, PB) which is associated with a pair of laser anemometers (CA, CB) being a plane that is parallel to the plane (PA0, PB0) tangential to the structure of the aircraft (A) at a reference point (RA, RB) that depends on the arrangement of the two laser anemometers of said pair (CA, CB) on the aircraft (A); and using the two duly calculated speed vectors (VA, VB), and at least one reference table, the respective values of the angle of incidence and the angle of sideslip of the aircraft (A) are determined.

2. The method as claimed in claim 1,
in which, for a pair of laser anemometers, the corresponding laser axes (L3, L4) emerge from one and the same point of the structure, and in which said reference point (RB) corresponds to this point of the structure.

3. The method as claimed in claim 1,
in which, for a pair of laser anemometers, the two corresponding laser axes (L1, L2) emerge from two different points of the structure, and in which said reference point (RA) corresponds to the middle of these two points.

4. The method as claimed in claim 1,
in which the external temperature is determined, and in which the true speed of the aircraft (A) is calculated, using the duly determined external temperature and said two speed vectors.

5. A device for determining anemometric parameters of an aircraft, said device (1) comprising at least one laser anemometer (A1 to A4) that is capable of measuring the wind speed along a laser axis (L1 to L4), in which:

four laser anemometers (A1 to A4) that are arranged in pairs (CA, CB) on the aircraft (A), said pairs (CA, CB) being mounted symmetrically relative to a vertical plane (PA, PB) that corresponds to a plane passing through the longitudinal axis of the aircraft (A) and orthogonal to the general plane of the supporting surface (2, 3) of said aircraft (A), each of said laser anemometers (A1 to A4) taking a measurement of the wind, which represents the projection (V1 to V4) of the wind speed vector on the corresponding laser axis (L1 to L4); and first processing means (4) for projecting, for each pair (CA, CB) of laser anemometers, the two measurements (V1, V2; V3, V4) onto an associated reference plane (PA, PB) and for calculating a speed vector (VA, VB) resulting from these two projections into this reference plane (PA, PB), said reference plane (PA, PB) which is associated with a pair (CA, CB) of laser anemometers being a plane that is parallel to the plane (PA0, PB0) tangential to the structure of the aircraft (A) at a reference point (RA, RB) that depends on the arrangement of the two laser anemometers of said pair (CA, CB) on the aircraft (A); and second processing means (5) for using the two duly calculated speed vectors (VA, VB), and at least one reference table, to determine the respective values of the angle of incidence and of the angle of sideslip of the aircraft (A).

6. An aircraft,
comprises a device (1) as specified under claim 5.

* * * * *